United States Patent [19]

Williams

[11] 3,783,836
[45] Jan. 8, 1974

[54] TIMER CONTROLLED FEEDER APPARATUS
[76] Inventor: Albert E. Williams, 502 Hawkins Blvd., Copiague, N.Y. 11726
[22] Filed: Nov. 16, 1972
[21] Appl. No.: 306,991

[52] U.S. Cl. .............................................. 119/51.14
[51] Int. Cl. .............................................. A01k 5/02
[58] Field of Search ...................... 119/51.14, 51.15

[56] References Cited
UNITED STATES PATENTS

| 1,076,193 | 10/1913 | Daminaitis | 119/51.15 X |
|---|---|---|---|
| 554,779 | 2/1896 | Hodgson | 119/51.14 |
| 280,084 | 6/1883 | Rose | 119/51.14 |
| 2,711,217 | 6/1955 | Gaty | 119/51.15 |
| 3,060,891 | 10/1962 | Downs | 119/51.15 |
| 790,835 | 5/1905 | Hayes | 119/51.15 |
| 760,482 | 5/1904 | Ray et al. | 119/51.15 |
| 211,773 | 1/1879 | Parker | 119/51.15 |

Primary Examiner—Louis G. Mancene
Assistant Examiner—J. A. Oliff
Attorney—Ralph E. Bucknam et al.

[57] ABSTRACT

A timer controlled feeder apparatus in which the timer has a projecting pin that secures a door closed to retain feed material within a receptacle until a preset time interval has elapsed, and then the timer pin moves to release the door for opening to discharge the feed material from the receptacle.

3 Claims, 3 Drawing Figures

PATENTED JAN 8 1974

3,783,836

3,783,836

TIMER CONTROLLED FEEDER APPARATUS

BACKGROUND AND SUMMARY OF THE INVENTION

The present invention relates in general to feeder apparatus for dispensing feed material to be consumed by horses and other livestock. More particularly the invention is directed to an improved timer controlled feeder apparatus for dispensing a quantity of feed material at the end of a preset time interval.

Timer controlled feeder equipment have been generally known in the prior art, as exemplified by U. S. Pat. No. 122,914 issued in 1872 to Ruggles and U. S. Pat. No. 3,060,891 issued in 1962 to Downs. Such prior art feeder apparatus has certain complexities that are eliminated in the apparatus of the invention, one of the objects of the invention being to provide a feeder apparatus that is both reliable and simple.

According to a preferred embodiment of the invention there is provided a receptacle for holding a quantity of feed material to be dispensed through an opening, and a door pivotally connected to the receptacle so as to be movable from a closed position covering the opening to an open position exposing the opening to allow exit of the feed material by gravity flow therethrough.

There is mounted to the receptacle for support thereby a timer having an output means, preferrably a projecting pin, disposed to engage the door to secure same in its closed position, until a preset time interval has elapsed. The timer output pin is moveable, upon the elapse of such interval to release the door for movement to its open position. Thus, the feed material is retained in the receptacle during the set interval, and is dispensed upon the elapse of such interval.

Simplicity and reliability is achieved by using a timer with an output pin positioned for underlying contact with the door to secure it closed, and which pin is moved to a position out of contact with the door; at the elapse of the set interval, to release the door to swing down into the open position.

For a better understanding of the invention and its several advantages, reference should be had to the accompanying drawing and following detailed description which together exemplify a preferred embodiment of the invention.

DESCRIPTION OF A PREFERRED EMBODIMENT OF THE INVENTION

Figure 1:
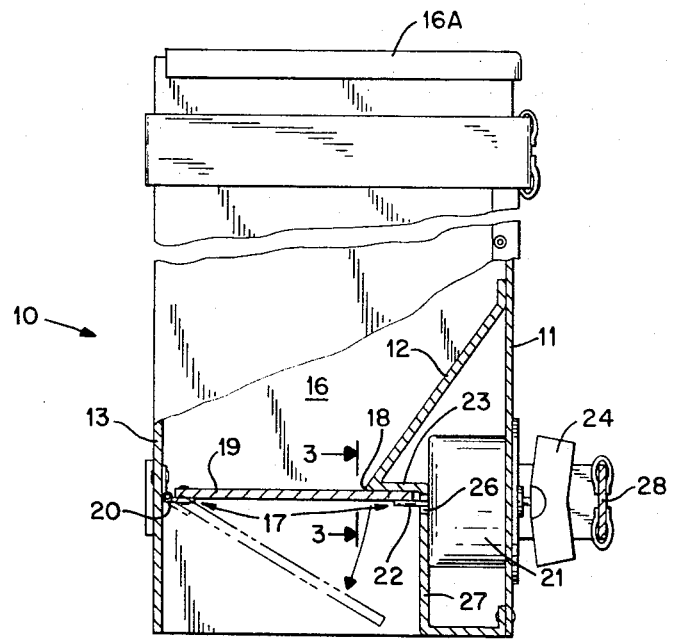
FIG. 1 is an elevation view, partly in section of a timer controlled feeder according to a preferred embodiment of the invention.
Figure 2:
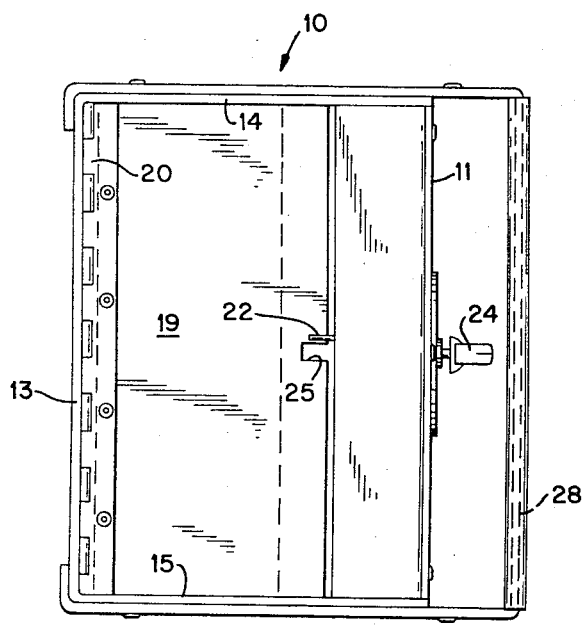
FIG. 2 is a bottom view of the feeder shown in FIG. 1.

In FIGS. 1 and 2 there is shown a timer controlled feeder apparatus 10 which is particularly useful for feeding horses and other livestock that require scheduled feeding.

Feeder apparatus 10 is expediently made of sheet metal, and has walls 11, 12, 13, 14 and 15 joined together to form a receptacle 16. The receptacle 16 is provided with a top cover 16A that is pivotable to an open position to allow the introduction of feed material (not shown) into receptacle 16. The quantity of feed material held by receptacle 16 is dispensed therefrom by gravity flow through a generally rectangular bottom opening 17 defined by the spaced walls 14, 15, 13 and corner edge 18 of wall 12.

A door 19 is connected to wall 13 by a hinge 20, and is pivotally moveable from the full outline closed position shown in FIG. 1 to the open position shown by phantom outline in FIG. 1. In the closed position, door 19 covers opening 17 to retain feed material within receptacle 16, whereas in the open position, door 19 is swung downwardly, by its own weight plus the weight of the feed material acting upon it, to allow the exit of the feed material through opening 17.

A timer 21 supported by receptacle 16 controls the opening of door 19 through the action of a projecting output pin 22 positioned for underlying contact with door 19 to secure same in its closed position, abutting against lip 23 of wall 12, until a preset time interval has elapsed. This time interval is determined by the amount of rotation imparted to a manually operable timesetting knob 24 extending from the front of receptacle 16. Upon the elapse of the set interval, the operation of timer 21 moves pin 22 to a position out of contact with door 19, thereby releasing door 19 for movement to the open position. As better seen from FIGS. 2 and 3, pin 22 moves along the underside of door 19 to a release position underlying a slot 25 in door 19.

Figure 3:
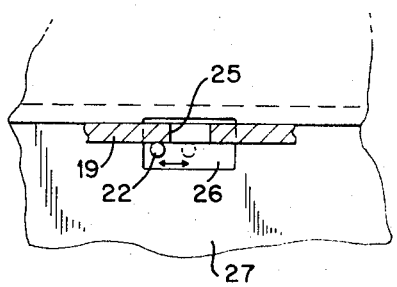
FIG. 3 is a detailed section view of the feeder shown in FIG. 1 as taken along line 3-3 therein.

Timer 21 can be any suitable prior art, commercially manufactured timer, preferably one which is mechanically powered by the turning of knob 24 in setting the time interval, and which has a projecting output means, such as pin 22 that moves from a reference position to distinctive, spaced-apart indicating position upon elapse of the preset interval. Thus, as seen in FIG. 3, pin 22, which projects through a clearance opening 26 in wall 27, is in the full outline left position after timer 21 is set and until elapse of the interval, and thereupon moves to the phantom outline right position underlying slot 25. One type of timer 22 used successfully had a pin 22 which moved along an arcuate path of sufficient radius that the rise of the pin 22 and door 19, as pin 22 travelled between the extreme positions shown in FIG. 3, was small enough to be taken up by providing a slight clearance between door 19 and lip 23. Using feed such as corn and other grain, a clearance in the order of 1/16 inch between door 19 and lip 23, when pin 22 is in the securing position, will not allow any run out of feed and will permit use of a timer 21 in which the pin 22 can be moveable either along a straight linear path, or along an arcuate path approximating such linear path.

Because the feeder 10 is intended for use in areas occupied by animals, there is provided a shielding bar 28 connected to receptacle 16 for support thereby, and positioned to encompass the timesetting knob 24 so as to limit the access thereto from the front and sides. This allows the attendant to set the knob 24 without any serious difficulty, but yet prevents the animals from biting on knob 24 or changing the setting thereof.

The feeder 10 is intended to be positioned above an area where the feed material is to be dropped, and for such purpose any conventional manner of securing and supporting feeder 10 in the desired location can be used.

From the foregoing it will be appreciated by the artisan that the invention is adaptable to many modifications and can be embodied in ways other than as shown and described by way of presentation here of a preferred embodiment.

What is claimed is:

1. In a timer controlled feeder apparatus having a receptacle for holding a quantity of feed material to be dispensed through an opening, a door movable from a closed position covering said opening for retaining the feed material within the receptacle to an open position allowing the exit of the feed material through said opening, the improvement which comprises a door having a slot extending inward from an edge of the door, a timer having an output means in the form of an extending pin disposed for underyling contact with said door at a location thereon adjacent said slot to secure said door in said closed position until a preset time interval has elapsed, and upon the elapse of said interval the timer operating to move said pin transversely to its longitudinal axis to a position underlying said slot to release the door for movement to said open position, whereby the feed material is retained within the receptacle during said interval and is dispensed therefrom upon the elapse of said interval.

2. The improvement according to claim 1 wherein said timer is supported by a wall of said receptacle and has a manually operable time-setting member extending therefrom, and including shielding means supported by said receptacle and positioned to encompass said time-setting member to limit the access thereto from a given direction.

3. The improvement according to claim 1 wherein said door is connected to the receptacle by a hinge for pivotal movement downward from a generally horizontal closed position upon release of the door by said timer pin.

* * * * *